United States Patent
Sampat et al.

(10) Patent No.: US 11,113,475 B2
(45) Date of Patent: Sep. 7, 2021

(54) CHATBOT GENERATOR PLATFORM

(71) Applicant: Accenture Global Solutions Limited, Dublin (IE)

(72) Inventors: Nirav Jagdish Sampat, Mumbai (IN); Saran Prasad, New Delhi (IN); Manish Jain, New Delhi (IN); Sriram Lakshminarasimhan, TamilNadu (IN); Dharmesh Dhirajlal Barochia, Pune (IN); Purnanga Prema Borah, Assam (IN); Deepali Jain, Noida (IN); Suhas Vinod Sane, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 324 days.

(21) Appl. No.: 16/384,240

(22) Filed: Apr. 15, 2019

(65) Prior Publication Data

US 2020/0327196 A1    Oct. 15, 2020

(51) Int. Cl.
| | |
|---|---|
| G06F 40/30 | (2020.01) |
| G06F 40/35 | (2020.01) |
| G06N 3/00 | (2006.01) |
| G06N 5/04 | (2006.01) |
| G06F 16/00 | (2019.01) |
| G06N 5/02 | (2006.01) |

(Continued)

(52) U.S. Cl.
CPC ............. *G06F 40/30* (2020.01); *G06F 16/00* (2019.01); *G06F 40/186* (2020.01); *G06F 40/35* (2020.01); *G06N 3/006* (2013.01); *G06N 5/022* (2013.01); *G06N 5/041* (2013.01); *G06N 20/00* (2019.01); *H04L 51/02* (2013.01)

(58) Field of Classification Search
CPC .......... G06F 40/30; G06F 40/35; G06F 16/00; G06F 40/186; G06N 3/006; G06N 5/041; G06N 5/022; G06N 20/00; H04L 51/02
USPC ................................................. 704/9
See application file for complete search history.

(56) References Cited

U.S. PATENT DOCUMENTS

| | | | | |
|---|---|---|---|---|
| 2012/0041903 A1* | 2/2012 | Beilby | .................. | G06N 20/00 706/11 |
| 2015/0161521 A1* | 6/2015 | Shah | ..................... | G06F 3/0481 706/12 |

(Continued)

OTHER PUBLICATIONS

Baudart, Guillaume, et al. "Reactive chatbot programming." Proceedings of the 5th ACM SIGPLAN International Workshop on Reactive and Event-Based Languages and Systems. 2018.*

*Primary Examiner* — Edwin S Leland, III
(74) *Attorney, Agent, or Firm* — Harrity & Harrity, LLP

(57) ABSTRACT

An example chatbot generation platform may receive a request to generate a chatbot; determine a chatbot template for the chatbot based on the request; obtain custom chatbot information according to the chatbot template; generate a chatbot corpus for the chatbot using the custom chatbot information and the chatbot template; generate a set of question and answer (QnA) pairs based on the chatbot corpus; configure a language analysis model for the chatbot; build the chatbot according to the set of QnA pairs and the language analysis model; and deploy the chatbot to a chatbot host platform for operation. The chatbot may be built to engage in an interaction with a user via the chatbot host platform, use the language analysis model to select one or more QnA pairs from the set of QnA pairs during the interaction, and train the language analysis model based on the interaction.

20 Claims, 7 Drawing Sheets

(51) Int. Cl.
*G06F 40/186* (2020.01)
*H04L 12/58* (2006.01)
*G06N 20/00* (2019.01)

(56) References Cited

U.S. PATENT DOCUMENTS

| | | | |
|---|---|---|---|
| 2017/0180284 A1* | 6/2017 | Smullen | H04L 69/14 |
| 2017/0344532 A1* | 11/2017 | Zhou | G06F 40/56 |
| 2018/0053119 A1* | 2/2018 | Zeng | G06F 40/295 |
| 2018/0054464 A1* | 2/2018 | Zhang | H04L 65/1096 |
| 2018/0054523 A1* | 2/2018 | Zhang | G06N 5/04 |
| 2018/0083898 A1* | 3/2018 | Pham | H04W 4/14 |
| 2018/0131645 A1 | 5/2018 | Magliozzi et al. | |
| 2018/0212904 A1* | 7/2018 | Smullen | H04L 67/322 |
| 2018/0367484 A1* | 12/2018 | Rodriguez | H04L 67/36 |
| 2019/0179608 A1* | 6/2019 | Kothari | G10L 15/26 |
| 2020/0081939 A1* | 3/2020 | Subramaniam | G06N 5/022 |
| 2020/0327196 A1* | 10/2020 | Sampat | G06F 40/35 |

* cited by examiner

CHATBOT GENERATOR PLATFORM

BACKGROUND

A chatbot is a user interface that is capable of conducting a conversation via audio and/or text. Accordingly, a chatbot may simulate how a user might interact during the conversation. The chatbot may use one or more analyses including speech-to-text, natural language processing, and/or the like to analyze a user input and/or determine an appropriate response to the user input.

SUMMARY

According to some implementations, a method may include receiving a request to generate a chatbot, wherein the request identifies a type of the chatbot; determining a chatbot template for the chatbot based on the type of the chatbot; obtaining chatbot information according to the chatbot template; generating, based on the chatbot template and chatbot information, a chatbot corpus for the chatbot; generating a set of question and answer (QnA) pairs; configuring, based on the chatbot corpus, a language analysis model for the chatbot, wherein the language analysis model is configured to select one or more QnA pairs of the set of QnA pairs during an interaction between the chatbot and a user; building the chatbot according to the set of QnA pairs and the language analysis model; and deploying the chatbot to a chatbot host platform to enable operation of the chatbot, wherein, during the operation of the chatbot, the language analysis model is trained based on the interaction with the user.

According to some implementations, a device may include one or more memories; and one or more processors, communicatively coupled to the one or more memories, configured to: receive, from a user device, a request to generate a chatbot, wherein the request identifies a characteristic of the chatbot; determine a chatbot template for the chatbot based on the characteristic of the chatbot; provide, to the user device, the chatbot template to permit the user device to provide chatbot information according to the template; receive the chatbot information after providing the chatbot template; generate, based on the chatbot template and chatbot information, a chatbot corpus for the chatbot; generate, based on the chatbot corpus, a set of question and answer (QnA) pairs for the chatbot; configure, based on the chatbot corpus and using the set of QnA pairs, a language analysis model for the chatbot; build the chatbot according to the set of QnA pairs and the language analysis model; and deploy the chatbot to a chatbot host platform for operation, wherein the chatbot, during operation, is configured to: engage in an interaction with a user via the chatbot host platform, use the language analysis model to select one or more QnA pairs from the set of QnA pairs during the interaction, and train the language analysis model based on the interaction.

According to some implementations, a non-transitory computer-readable medium may store one or more instructions. The one or more instructions, when executed by one or more processors of a device, may cause the one or more processors to: receive a request to generate a chatbot; determine a chatbot template for the chatbot based on the request; obtain chatbot information according to the chatbot template; generate, using a first machine learning model, a chatbot corpus for the chatbot, wherein the first machine learning model generates the chatbot corpus using the chatbot information and the chatbot template. generate, using a second machine learning model, a set of question and answer (QnA) pairs based on the chatbot corpus; configure, using a third machine learning model, a language analysis model for the chatbot; build the chatbot according to the set of QnA pairs and the language analysis model; and deploy the chatbot to a chatbot host platform for operation, wherein the chatbot is built to, while under operation: engage in an interaction with a user via the chatbot host platform, use the language analysis model to select one or more QnA pairs from the set of QnA pairs during the interaction, and train the language analysis model based on the interaction.

DETAILED DESCRIPTION

Figure 1A:
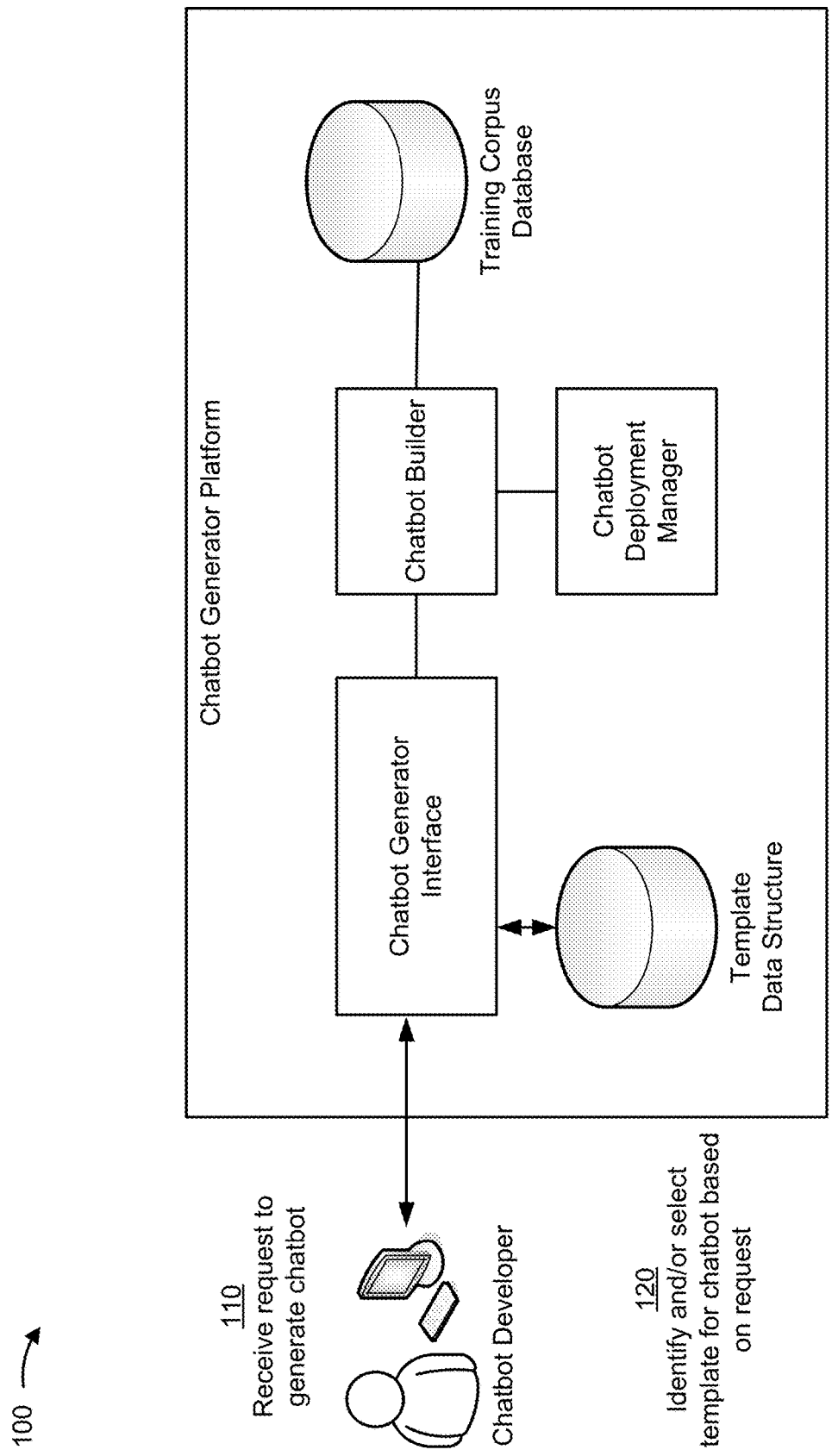
FIGS. 1A and 1B are diagrams of one or more example implementations described herein.

The following detailed description of example implementations refers to the accompanying drawings. The same reference numbers in different drawings may identify the same or similar elements.

In some instances, a chatbot may include an artificial intelligence-based and/or machine learning-based platform that can be configured to receive, from a user, human language (e.g., in the form of audio data (e.g., voice data), text data, and/or the like), interpret the human language, and appropriately respond to the user using natural language processing. In previous techniques, creating a chatbot for one or more specific purposes (e.g., topics, contexts, and/or the like) involves extensive and/or complex development processes, testing processes, and/or the like. For example, previous techniques typically involve developing certain elements of a chatbot from scratch. In such cases, one or more complex systems may be utilized for researching the requirements for the chatbot, for collecting language for the chatbot, for generating a corpus (e.g., a database of words, phrases, sentences, and/or the like that may be used in association with the chatbot), for formatting code for the chatbot, for building the chatbot, for launching the chatbot, etc.

Such complex systems may consume and/or require a plurality of computing resources (e.g., processing resources, memory resources, storage resources, and/or the like) and/or network resources (e.g., communication resources involved in exchanging information associated with the development of the chatbot between the complex systems). Furthermore, in some instances, a chatbot is to be reviewed, tested, and/or approved for launch. Due to the amount of time involved in reviewing, testing, and/or approving chatbots, relatively large queues of chatbots (or sets of code for implementing the chatbots) may form, further consuming and/or requiring more computing resources to store and/or process the chatbots in the queue.

According to some implementations, the present disclosure describes a chatbot generator platform that permits relatively quick and efficient generation of chatbots for one or more specific purposes, topics, and/or contexts. In some implementations, the chatbot generator platform may utilize one or more preconfigured templates and/or one or more preconfigured corpuses to assemble a chatbot. For example, the one or more preconfigured templates may be selected and/or provided to facilitate generation of the one or more corpuses based on a characteristic of the chatbot that is to be assembled. More specifically, the one or more preconfigured templates may be selected and/or provided, and the one or more preconfigured corpuses may be generated based on a type of the chatbot, a format of the chatbot, a source associated with the chatbot, and/or the like.

In some implementations, the chatbot generator platform may configure one or more models (e.g., one or more machine learning models) for the chatbot that are to control the chatbot during operation and/or that are to control the chatbot to operate in a configured manner during operation. For example, the chatbot generator platform may configure a language analysis model according to the chatbot template and/or chatbot corpus. In some implementations, the language analysis model may be configured to control the chatbot under operation. For example, the language analysis model, during operation, may be configured to select one or more question and answer (QnA) pairs to interact with a user, may be configured to be trained according to inputs received from the user (e.g., based on a response associated with a question and/or answer of a certain QnA pair), may be configured to be trained according to interactions involving other chatbots associated with the chatbot generator platform, and/or the like.

Furthermore, some implementations described herein use a rigorous, computerized process to perform tasks or activities that were not previously performed. For example, previously, there did not exist a technique to receive a request for a chatbot, determine a template for the chatbot, generate a corpus for the chatbot according to chatbot information associated with the chatbot (which may be referred to herein as "custom chatbot information"), configure a language analysis model for the chatbot, build the chatbot, and deploy the chatbot for use. Furthermore, the process for generating the chatbot, as described herein, conserves computing resources (e.g., processor resources, memory resources, and/or the like) that would otherwise be wasted by repeatedly recreating corpuses for the chatbot, recreating one or more models for the chatbot, transferring information associated with developing the chatbots between systems, and/or the like. In this way, the chatbot generator platform described herein enables customized generation of chatbots by using reusable knowledge bases (e.g., preconfigured templates, reusable chatbot corpuses, and/or the like), thus conserving computing resources, network resources, and/or the like.

As described herein, the chatbot generator platform may use one or more artificial intelligence techniques, such as machine learning, deep learning, and/or the like to receive a request to generate a chatbot, process the request, and/or generate one or more components of a chatbot according to the request.

Figure 1B:
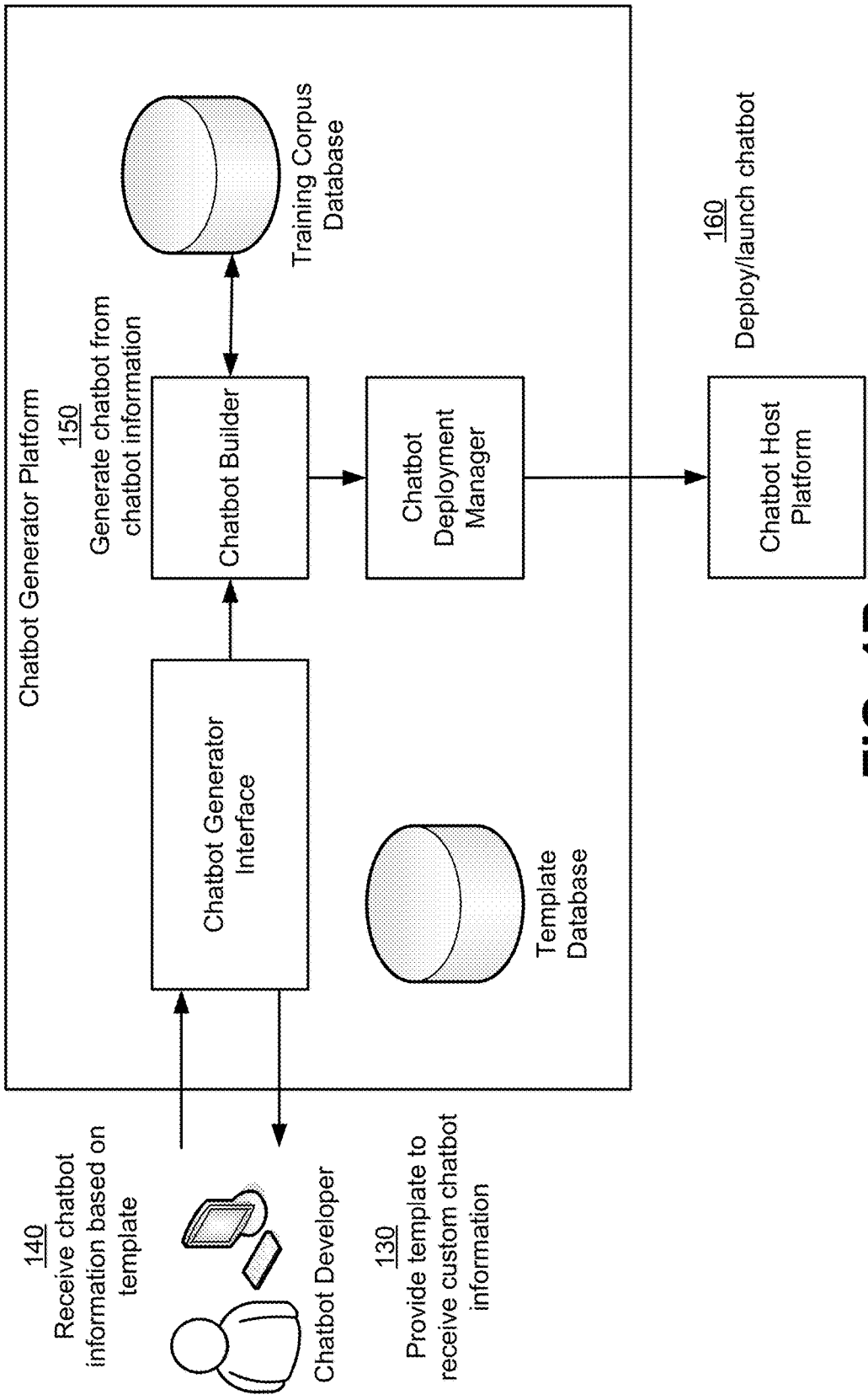

FIGS. 1A and 1B are diagrams of an example implementation 100 described herein. In example implementation 100, a chatbot developer (e.g., any individual that has an interest in having a chatbot generated) utilizes a chatbot generator platform to have a chatbot generated, tested, and/or launched, as described herein. As described herein, the generated chatbot is to be created to enable interactions with a chatbot user (which may referred to herein simply as a "user"). The chatbot developer may use any suitable device (e.g., a user device, such as a computer, a smartphone, and/or the like) to communicate with the chatbot generator platform (e.g., to provide details or information associated with the chatbot that is to be generated). The chatbot generator platform, of example implementation 100, may include a chatbot generator interface, a template database, a chatbot builder, a training corpus database, and/or a chatbot deployment manager, which may be configured to manage deployment of the generated chatbot to a chatbot host platform.

As shown in FIG. 1A, and by reference number 110, the chatbot generator platform receives a request to generate a chatbot from the chatbot developer. For example, the chatbot generator platform may receive the request via the chatbot generator interface and determine that a chatbot is to be generated for the chatbot developer based on receiving the request. As described herein, the chatbot generator platform enables a chatbot developer to quickly and efficiently generate a chatbot by simplifying the process for generating a chatbot. Accordingly, the chatbot developer may be an individual with chatbot development experience (e.g., a software engineer) or may not be an individual with chatbot development experience. Accordingly, the chatbot developer may be any user (e.g., a customer of an entity associated with the chatbot generator platform) that desires that a new chatbot be created for any purpose.

The request may indicate one or more characteristics associated with the chatbot developer. For example, the request may include identification information associated with the chatbot developer (or a device in use by the chatbot developer), subscription information associated with the chatbot developer (e.g., which may indicate a service level agreement (SLA) that is to be considered during generation of the chatbot), an entity associated with the chatbot developer (e.g., an organization that is to utilize the chatbot in association with a service provided by the entity), a role or title associated with the chatbot developer, and/or the like.

In some implementations, the one or more characteristics of the chatbot developer may be derived from and/or determined based on information received in the request. For example, the chatbot developer may log in, via the chatbot generator interface, to the chatbot generator platform using a set of credentials. The chatbot generator platform may use a data structure that maps the credentials of the chatbot developer to the one or more characteristics of the chatbot developer (which may have been previously received or stored in the data structure) to permit the chatbot generator platform to receive and/or determine the one or more characteristics of the chatbot developer.

Additionally, or alternatively, the request may include one or more characteristics of the chatbot that is to be generated. For example, the one or more characteristics of the chatbot may include a type of the chatbot. The type of the chatbot may correspond to a particular purpose or use of the chatbot. For example, the chatbot may be configured to be one or more of a frequently asked question (FAQ) chatbot, a survey chatbot, a layer 1 (L1) support chatbot, a project chatbot, an information technology (IT) support chatbot, a sales assistant chatbot, and/or the like. Additionally, or alternatively, the one or more characteristics of the chatbot may include a format of the chatbot. The format of the chatbot may correspond to a particular organizational flow of the chatbot. For example, the format may indicate whether the chatbot is involved with a single topic, multiple topics, a hierarchical set of topics, and/or the like. Accordingly, the format may indicate whether the chatbot is to use a guided workflow (e.g., a series of inputs are to be expected from a user, each of which are to be followed by a corresponding response, and/or vice versa), or an open-ended workflow (e.g., various unexpected types of user inputs may be received and corresponding responses may be generated and/or provided based on a real-time analysis of the user inputs). In some implementations, the one or more characteristics may include a source associated with the chatbot. The source may identify an application, a platform, and/or an entity (e.g., an organization associated with the application, platform, and/or service) that is associated with the chatbot. For example, the source may include and/or indicate information associated with the source, such as an address (e.g., an internet protocol (IP) address), a location, a language (e.g., English, Spanish, and/or the like), a programming language (e.g., JavaScript, hypertext markup language (HTML), and/or the like), an expected number of users (or a usage rate) for the chatbot, and/or the like.

In some implementations, one or more of the characteristics of the chatbot may be derived and/or determined from the one or more characteristics of the chatbot developer. For example, if the request indicates that the chatbot developer is a sales assistant, the platform may determine that the type of chatbot that is to be generated is a likely a sales assistant chatbot, or if the request indicates that the chatbot developer is in human resources, that the type of chatbot to be generated is a survey chatbot, and so on. As another example, a source may be derived from the credentials of the chatbot developer when logging into the chatbot interface and/or identification information provided to the chatbot generator interface.

In some implementations, the chatbot generator interface may receive the request as a series of user inputs from the chatbot developer. For example, the chatbot generator interface may receive one or more of the above characteristics of the chatbot and/or one or more of the characteristics of the chatbot developer in a plurality of messages from the chatbot developer. In some implementations, the plurality of messages may be provided in response to prompts from the chatbot generator interface. According to some implementations, the chatbot generator interface may include and/or be implemented by a chatbot that is configured to interact with the chatbot developer to receive adequate details for the chatbot. In such cases, the chatbot generator interface may prompt the user, through the series of user inputs, to provide the one or more characteristics of the chatbot developer and/or the one or more characteristics of the chatbot to permit the chatbot generator interface to identify a template that is to be used for generating the chatbot. Further, the chatbot generator interface may parse natural language descriptions of the characteristics of the chatbot and/or the characteristics of the chatbot developer. For example, the chatbot generator interface may obtain data identifying, in natural language, a description of the one or more characteristics of the chatbot and/or a description of the one or more characteristics of the chatbot developer, and may parse the data to identify the one or more characteristics of the chatbot, the one or more characteristics of the chatbot developer, and/or the like.

In this way, the chatbot generator platform may receive a request to generate a chatbot that includes adequate information to permit the chatbot generator platform to identify a template that may be used to generate the chatbot.

As further shown in FIG. 1A, and by reference number 120, the chatbot generator platform identifies a template for the chatbot based on the request. For example, the chatbot generator platform may store a plurality of templates (e.g., preconfigured templates) in the template data structure. The identified template may have been previously configured and/or generated according to one or more characteristics of chatbots that are to be generated. For example, certain templates may be configured for particular types of chatbots, for particular formats of chatbots, for particular sources of chatbots, and/or the like. According to some implementations, the templates may be implemented by one or more files. For example, the template may be a spreadsheet file (e.g., with fillable rows and/or columns), a word processing document, a portable document format (PDF) file (e.g., with fillable fields), and/or the like.

The template data structure may include a table, an index, a graph, a database, and/or the like that is sorted (e.g., organized) according to certain characteristics of chatbots that are to be generated (or chatbots that have been generated by the chatbot generator platform). In some implementations, the template data structure may be sorted according to certain characteristics of chatbot developers. Therefore, based on applying a process associated with analyzing the request (e.g., using a natural language processing analysis) and/or one or more user inputs from the request, the chatbot generator platform may be capable of recognizing and/or identifying hundreds, thousands, or millions of characteristics of thousands or millions of chatbots and/or chatbot developers. In this way, the chatbot generator interface may reference the template data structure to identify a particular template that corresponds to the one or more characteristics of the chatbot and/or the one or more characteristics of the chatbot developer that were received in the request. Accordingly, the chatbot generator platform, from such characteristics in a request, may select a template that corresponds to such characteristics (e.g., a template that is configured for a chatbot that shares one or more of the same characteristics).

In some implementations, the chatbot generator platform may use a machine learning model, such as a template selection model, to identify and/or select a template that is to be used to receive custom chatbot information from the chatbot. For example, the chatbot generator platform may train the template selection model based on one or more template selection parameters, such as the one or more characteristics of chatbots, the one or more characteristics of chatbot developers, and/or the like. The chatbot generator platform may train the template selection model using historical data associated with identifying and/or selecting a template for generation of a chatbot according to the one or more template selection parameters. Using the historical data to train the template selection model and the one or more template selection parameters as inputs to the template selection model, the chatbot generator platform may select the best template (according to the trained template selection model) to enable the chatbot developer to provide the most appropriate custom chatbot information (according to the trained template selection model) that can be used to generate the chatbot, as described herein.

As an example, the chatbot generator platform (e.g., via the chatbot generator interface) may determine that previously received characteristics of a chatbot and/or a chatbot developer are associated with a threshold probability of being associated with a particular chatbot template. In this case, the chatbot generator platform may determine that a relatively high score (e.g., as being likely to be identified) is to be assigned to characteristics that are determined to be the same or similar as previously identified characteristics associated with the particular template (or more frequently identified than past identified characteristics). In contrast, the chatbot generator platform may determine that a relatively low score (e.g., as being unlikely to be identified) is to be assigned to characteristics associated with templates that are determined to be different than past identified characteristics of the particular template (or less frequently identified than past identified characteristics). In this way, a template associated with a previously generated chatbot that may be similar to a chatbot that is to be generated (as indicated by the request) can be selected.

In some implementations, the chatbot generator platform may perform a data preprocessing operation when generating the template selection model. For example, the chatbot generator platform may preprocess data (e.g., data that includes one or more sample characteristics of a chatbot, data that includes one or more sample characteristics of a chatbot developer, and/or the like) to remove certain types of data or information from the data. In this way, the chatbot generator platform may organize thousands, millions, or billions of data entries, for machine learning associated with the template selection model, that are associated with previously received and/or known potential characteristics of chatbots and/or chatbot developers.

Accordingly, the chatbot generator platform may identify and/or select a template that is to be used to receive custom chatbot information to enable a chatbot to be generated according to the request, as described herein.

As shown in FIG. 1B, and by reference number 130, the chatbot generator platform provides the selected template to the chatbot developer in order to receive custom chatbot information for the chatbot. As described herein, the template may be provided to cause the device of the chatbot developer to prompt the chatbot developer to provide the custom chatbot information. The custom chatbot information may include specific chatbot information and/or unique chatbot information that may be associated with the chatbot, such as one or more topics (e.g., subject matter that is to be discussed and/or involved in interactions with the chatbot), contexts (e.g., specific language and/or unique language that may be used to discuss the one or more topics), and/or the like.

Accordingly, the preconfigured template may include a form and/or a series of fields that enable the chatbot developer to provide the custom chatbot information relative to particular requests in the form and/or or corresponding requests associated with the series of fields. For example, the template may request the chatbot developer to indicate one or more particular topics associated with the chatbot. Such topics may correspond to an industry associated with the chatbot, a service associated with the chatbot, an entity associated with the chatbot, and/or the like. In this way, the topics may provide specific information and/or unique details that enable the chatbot generator platform to determine and/or generate custom context for the chatbot. In some implementations, the custom chatbot information may include certain contexts for the chatbot. In such cases, the selected template may prompt the chatbot developer to provide particular language, phrases, sentences, and/or the like that are unique to the topic and/or that may be uniquely used by the chatbot.

In this way, the chatbot generator platform may provide the selected template to the chatbot developer to permit the chatbot developer to provide custom chatbot information according to the template.

As further shown in FIG. 1B, and by reference number 140, the chatbot generator platform, via the chatbot generator interface, receives the custom chatbot information based on the template. The custom chatbot information may include information that is to be used to generate the chatbot. The custom chatbot information may be sorted and/or organized according to the provided template. For example, the template may prompt the chatbot developer to provide specific information, associated with the chatbot, in the context of the template. In this way, the custom chatbot information may be received as structured data that is organized according to the template.

Similar to receiving the request above, the chatbot generator platform may utilize a chatbot to provide the template and/or receive custom chatbot information. Such a chatbot may be the same chatbot that is used to receive the request or a different chatbot that is separately configured to receive the custom chatbot information. In such cases, the chatbot generator platform may use a machine learning model to request and/or receive custom chatbot information via one or more of the templates.

According to some implementations, while receiving the custom chatbot information and/or upon receipt of the custom chatbot information, the chatbot generator platform may perform a data preprocessing operation associated with organizing the custom chatbot information for the chatbot. For example, the chatbot generator platform, via the chatbot generator interface, may preprocess data (e.g., data structured according to the template, and/or the like) to remove certain types of data or information from the data (e.g., non-American Standard Code for Information Interchange (ASCII) characters, white spaces, confidential data, and/or the like). In this way, the chatbot generator interface may organize the custom chatbot information into corresponding data entries for a chatbot generation model that is to be used to generate and/or build the chatbot.

Accordingly, the chatbot generator platform may receive custom chatbot information that can be utilized to generate a chatbot, as described herein.

As further shown in FIG. 1B, and by reference number 150, the chatbot builder may generate the chatbot from the chatbot information. As described herein, the chatbot generator platform, via the chatbot builder, may generate a chatbot corpus for the chatbot, a set of QnA pairs for the chatbot from the corpus, and/or a language analysis model for the chatbot based on the set of QnA pairs and/or chatbot corpus. In some implementations, the chatbot generator platform may use one or more machine learning models to generate the chatbot corpus, the set of QnA pairs, and/or the language analysis model. For example, the chatbot generator platform may utilize a chatbot generation model, which may include one more machine learning models, to generate the chatbot corpus, determine the set of QnA pairs, and/or configure a language analysis model for the chatbot, as described herein.

The chatbot generator platform, via the chatbot builder, may generate a chatbot corpus for a chatbot according to the custom chatbot information and/or the template used to receive the custom chatbot information. The chatbot corpus may include or correspond to an architectural structure of the chatbot. For example, the chatbot corpus may establish a workflow (e.g., a guided workflow, an open-ended workflow, and/or the like) of communications for an interaction with a user of the chatbot. In some implementations, the chatbot corpus, via the workflow, may include and/or provide specific phrases (e.g., questions for the user and/or responses to the user) that can be used during an interaction with the user along with timing associated with the interaction during which the specific phrases are to be used (e.g., before or after other questions or responses, in response to certain user inputs, and/or the like). Accordingly, the chatbot corpus may include a set of simulated user inputs and/or a set of simulated responses that may correspond to certain user inputs and/or user responses that are expected to be received during an interaction between the chatbot and a user.

According to some implementations, the chatbot generator platform, via the chatbot builder, may utilize one or more training chatbot corpuses from the training corpus data structure to generate a chatbot corpus from the custom chatbot information. The training corpus data structure may be any suitable data structure (e.g., a table, an index, a graph, a database, and/or the like) that is capable of storing chatbot corpuses (e.g., chatbot corpuses previously generated by the chatbot generator platform, chatbot corpuses received from chatbot developer, chatbot corpuses received from other chatbot generator platforms, and/or the like). The chatbot corpuses of the training corpus data structure may be used to train a machine learning model of the chatbot generator platform to generate a chatbot corpus for a chatbot, as described herein.

In some implementations, the chatbot builder may identify and/or select one or more chatbot corpuses based on the custom chatbot information and/or the template that can be used within the chatbot corpus for the chatbot. For example, according to certain information provided in the custom chatbot information (e.g., information identifying a particular topic and/or context for the chatbot), the chatbot generator platform may generate a chatbot corpus from a training chatbot corpus by translating information from the custom chatbot information (which is sorted according to the template) to one or more corresponding elements (e.g., words, phrases, and/or the like) of the training chatbot corpus. For example, the training chatbot corpuses may be sorted and/or organized according to particular topics and/or contexts. In this way, chatbots that are to be generated for similarly related topics and/or contexts can be generated from the training chatbot corpuses by replacing words and/or phrases from the training chatbot corpus with corresponding words or phrases from the custom chatbot information. The corresponding words or phrases may be identified based on the words or phrases being included within the custom chatbot information according to the template.

In some implementations, the chatbot generator platform may use a machine learning model, such as a chatbot corpus generator model, to generate a chatbot corpus for a chatbot. For example, the chatbot generator platform may train the chatbot corpus generator model based on one or more chatbot corpus generation parameters used to generate a chatbot corpus for a chatbot, such as characteristics of the chatbot, characteristics of one or more topics of the chatbot, characteristics of one or more contexts of the chatbot, one or more sets of simulated user inputs and/or sets of simulated responses in training chatbot corpuses, and/or the like. The chatbot generator platform may train the chatbot corpus generator model using historical data associated with generating a chatbot corpus (e.g., including one or more corpuses in the training corpus data structure) according to the one or more chatbot corpus generation parameters. Using the historical data to train the chatbot corpus generator model and the one or more chatbot corpus generation parameters as inputs to the chatbot corpus generator model, the chatbot generator platform may generate a chatbot corpus to enable generation of a corresponding chatbot that can be used to facilitate an interaction between the chatbot and a user, as described herein.

In some implementations, the chatbot generator platform, via the chatbot builder, may generate a set of QnA pairs for the chatbot. The set of QnA pairs may be a configured set of questions and/or answers that may be utilized by the chatbot to interact with a user. The set of QnA pairs maybe configured to gather information from the user, verify credentials of the user, authenticate the user, determine information associated with an interaction with the user, provide information associated with the interaction, and/or the like. The set of QnA pairs may be generated based on the custom chatbot information and/or template. For example, the QnA pairs may be generated (e.g., using natural language processing) based on the format of the chatbot (whether a guided flow or open-ended flow), based on one or more topics included in the custom chatbot information for the chatbot, based on one or more contexts included in the custom chatbot information for the chatbot, and/or the like. Such topics and/or contexts may correspond to topics or contexts that are expected to be the subject and/or context of the interaction. In some implementations, the set of QnA pairs may be generated based on a certain training corpus (e.g., a training corpus that has one or more similar characteristics included in the custom chatbot information). For example, the training corpus may be a same type of the chatbot, a same format of the chatbot, a same source of the chatbot, a chatbot associated with a same topic, a chatbot associated with a same context, and/or the like.

In some implementations, the chatbot generator platform may use a machine learning model, such as a QnA generator model, to generate a set of QnA pairs for the chatbot. For example, the chatbot generator platform may train the QnA generator model based on one or more QnA generation parameters, such as the format of the chatbot, the topic of the chatbot, the context of the chatbot, the chatbot corpus, and/or the like. The chatbot generator platform may train the QnA generator model using historical data associated with generating sets of QnA pairs according to the one or more QnA generation parameters. Using the historical data to train the QnA generator model and the one or more QnA generation parameters as inputs to the QnA generator model, the chatbot generator platform may generate a most useful set of QnA pairs (according to the trained QnA generation model) to enable the chatbot to determine a most accurate response to a user and/or from the user (according to the trained QnA generation model) in order to correspondingly facilitate the interaction, as described herein.

In some implementations, the chatbot generator platform, via the chatbot builder, may configure a language analysis model for the chatbot. The language analysis model may be configured according to the chatbot corpus to facilitate an interaction with a user. For example, the language analysis model may be used, during operation of the chatbot, to select one or more of the sets of QnA pairs during the interaction with the user, to permit the user to receive requested information from the user, and/or to permit the chatbot (and correspondingly, an entity associated with the chatbot) to receive information associated with the user (e.g., feedback, status information, account related information, service related information, and/or the like). The chatbot generator platform may use one or more analyses and/or processes to generate and/or configure the language analysis model for the chatbot such that the language analysis model enables the chatbot to adapt to various characteristics of the interaction, such as various types of communications, topics, contexts, languages, sentiments, and/or the like. For example, the chatbot generator platform may configure the language analysis model to use a sentiment analysis in combination with a classification technique, such as a logistic regression classification technique, a random forest classification technique, a gradient boosting machine (GBM) learning technique, and/or the like, to determine a categorical outcome (e.g., that the chatbot responded appropriately, that the chatbot responded inappropriately, and/or the like) during the interaction.

In some implementations, the chatbot generator platform may perform a data preprocessing operation when generating the language analysis model. For example, the chatbot generator platform may preprocess data (e.g., the generated chatbot corpus, the one or more sets of QnA pairs, the template, one or more training corpuses used to generate the chatbot corpus, and/or the like) to remove potential unrelated data (e.g., words, phrases, QnA pairs that are determined to be unrelated to the chatbot), and/or the like. In this way, the chatbot generator platform may organize thousands, millions, or billions of data entries for machine learning and/or generation of the language analysis model.

In some implementations, the chatbot generator platform may configure the language analysis model to perform a training operation. For example, the chatbot generator platform may cause the language analysis model to portion the training corpus data structure into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the language analysis model may be configured to preprocess and/or perform dimensionality reduction to reduce the training corpuses of the training corpus data structure to a minimum feature set. In some implementations, the chatbot generator platform may train the language analysis model on this minimum feature set, thereby reducing processing to train the language analysis model, and may apply a classification technique to the minimum feature set.

Additionally, or alternatively, the chatbot generator platform may configure the language analysis model to use a naive Bayesian classifier technique. In this case, the language analysis model may be configured to perform binary recursive partitioning to split data of the minimum feature set into partitions and/or branches and use the partitions and/or branches to perform predictions (e.g., that the chatbot is or is not to respond in a particular manner, that the user is or is not going to provide a certain user input, and/or the like). Based on using recursive partitioning, the language analysis model may reduce utilization of computing resources to operate the chatbot relative to linearly sorting and analyzing data points, thereby enabling use of thousands, millions, or billions of the data points to train the language analysis model, which may result in a more accurate model than using fewer data points.

Additionally, or alternatively, the chatbot generator platform may configure the language analysis model to use a support vector machine (SVM) classifier technique to generate a non-linear boundary between data points in the training set. In this case, the non-linear boundary is used to classify test data (e.g., data relating to a characteristic or feature of a certain topic) into a particular class (e.g., a class indicating that the characteristic or feature is related to the topic, a class indicating that the characteristic or feature is not related to the topic, and/or the like).

Additionally, or alternatively, the chatbot generator platform may configure the language analysis model to be trained using a supervised training procedure that includes receiving input to the language analysis model from a subject matter expert, which may reduce an amount of time, an amount of processing resources, and/or the like to train the language analysis model relative to an unsupervised training procedure. In some implementations, the supervised training procedure may utilize user inputs during interactions to train the language analysis model. For example, the language analysis model may determine a sentiment of the user to determine whether responses or communications of the chatbot during the communication were appropriate. More specifically, the language analysis model may use a sentiment analysis technique to determine whether the user is angry, indicating that a response was likely not appropriate (or did not provide information desired by the user). In such cases, the language analysis model may determine that such a response (or question) is to not to follow a future corresponding user input from the user during the interaction or another user during another interaction.

In some implementations, the chatbot generator platform may configure the language analysis model to use one or more other model training techniques, such as a neural network technique, a latent semantic indexing technique, and/or the like. For example, the language analysis model may be configured to perform an artificial neural network processing technique (e.g., using a two-layer feedforward neural network architecture, a three-layer feedforward neural network architecture, and/or the like) to perform pattern recognition with regard to patterns of whether user inputs and/or user responses described using different semantic descriptions can be used to select or determine a response. In this case, using the neural network processing technique may improve an accuracy of the language analysis model by enabling the language analysis model to be more robust to noisy, imprecise, or incomplete data, and by enabling the language analysis model to detect patterns and/or trends.

As an example, the chatbot generator platform may configure the language analysis model to determine, using a linear regression technique, that a particular answer to a particular question from the user (e.g., from the set of QnA pairs for the chatbot) does not facilitate an interaction (e.g., user becomes confused, angry, and/or the like as determined from user responses to the answer), and may determine that the answer is to receive a relatively low association score for that question. In contrast, the chatbot generator platform may configure the language analysis model to determine that another answer to the question does facilitate the interaction and may assign a relatively high association score to that answer for that question. Based on the characteristics of the answer to the question facilitating the interaction (or not facilitating the interaction), the chatbot generator platform may configure the language analysis model to analyze and/or determine new QnA pairs for the chatbot during operation of the chatbot (e.g., after the chatbot is launched).

Accordingly, the chatbot generator platform may configure the language analysis model to learn (e.g., be trained to determine) whether or not certain sets of responses to user inputs of interactions are appropriate (e.g., accurate, up to date, adequate to facilitate an interaction with the user, and/or the like). For example, the language analysis model may be trained during operation of the chatbot, in real-time, according to the interaction with the user. In some implementations, the language analysis model may be trained based on one or more other interactions associated with the chatbot, or one or more other interactions associated with one or more other chatbots. In this way, the chatbot generator platform may configure the language analysis model for the chatbot to use any number of artificial intelligence techniques, machine learning techniques, deep learning techniques, and/or the like to facilitate interactions between users and the chatbot. In some implementations, the language analysis model (or language analysis model of the chatbot) may utilize or be associated with one or more application programming interfaces (APIs) associated with such techniques or analyses. The APIs may be associated with the chatbot during deployment of the chatbot and/or when the chatbot is launched (e.g., by a chatbot host platform).

In some implementations, when building the chatbot, the chatbot generator platform, via the chatbot builder, may configure the chatbot to utilize one or more services deployed within a cloud environment. For example, the chatbot generator platform may configure the chatbot to access one or more platforms (e.g., a natural language processing platform, an application platform, an authorization platform, a user interface platform, a spell check platform, a speech-to-text (STT) platform, a QnA platform, and/or the like) that are associated with the services to permit the chatbot to interact with a user during operation. In some implementations, to permit the chatbot to utilize and/or access the one or more platforms, the chatbot generator platform may configure one or more APIs for the chatbot when building the chatbot. Such APIs may be configured to permit the chatbot to automatically interact with and/or exchange information (e.g., via API calls) between such platforms to enable operation of the chatbot during an interaction with a user. For example, an API call to a QnA platform may be made to request and/or configure a QnA pair according to the chatbot information. As another example, an API call to a spell check platform may be made to request a correction to an input and/or determine a likely intended input corresponding to the input. In this way, the chatbot generator platform, when building the chatbot, may configure the chatbot to automatically access and/or utilize one or more cloud-based (or web-based) services to permit the chatbot to operate and/or interact with a user after deployment and/or launch of the chatbot.

As described herein, the chatbot generator platform, via the chatbot builder, may build the chatbot. For example, the chatbot generator platform may build the chatbot by assembling code for the chatbot, that when executed (e.g., via a chatbot host platform), implements the chatbot and permits the chatbot to engage in interactions with users. The chatbot generator platform may build the chatbot based on the generated chatbot corpus, the generated set of QnA pairs, and the configured language analysis model. In some implementations, to build the chatbot, the chatbot generator platform may utilize a certain code structure for the chatbot (e.g., which may be based on a particular chatbot host platform that is to host the chatbot) and insert data from the generated chatbot corpus, the set of QnA pairs, and the language analysis model into the structure. In some implementations, the chatbot generator platform may maintain and/or store a plurality of code structures corresponding to different chatbot host platforms that may be configured to host the chatbots generated by the chatbot generator platform.

Accordingly, when building the chatbot, the chatbot generator platform may configure the chatbot to use the language analysis model to select one or more QnA pairs during an interaction, train the language analysis model during the interaction, train the language analysis model according to one or more other interactions with one or more other chatbots, and/or the like.

In some implementations, when building the chatbot, the chatbot may generate the chatbot to have certain restrictions (e.g., a certain number of users can access the chatbot, a certain number of uses of the chatbot, a certain number of topics can be associated with the chatbot, and/or the like). For example, the chatbot generator platform may generate a trial chatbot that can be relatively quickly generated based on the preconfigured templates and/or preconfigured corpuses. Additionally, or alternatively, the chatbot generator platform may generate a full version chatbot (e.g., an enterprise chatbot that may not have any restrictions) that can be generated based on the one or more preconfigured templates and/or the one or more preconfigured corpuses along with one or more other data sets (e.g., code snippets, executions of code snippets, and/or the like). In some implementations, a language analysis model may not be trained during use while the language analysis model of the full version is configured to be trained. According to some implementations, the full version chatbot may be generated based on the results of using the trial chatbot. In such cases, the chatbot generator platform may perform an operation to reconfigure the language analysis model of the trial version of the chatbot to be trained according to interactions associated with the chatbot or interactions associated with one or more other chatbots. In some implementations, the adaptation may be made based on the chatbot developer providing credentials that indicate that the chatbot is to be upgraded from the trial version to the full version (e.g., based on a change to the subscription status or SLA of the chatbot developer).

In this way, the chatbot generator platform may build the chatbot to permit the chatbot to be deployed to a chatbot host platform and/or launched for operation.

As further shown in FIG. 1B, and by reference number 160, the chatbot generator platform, via the chatbot deployment manager, may deploy and/or launch the chatbot to a chatbot host platform. The chatbot host platform may be associated with a source identified in the request to generate the chatbot. In some implementations, the chatbot host platform may include and/or may be a web-based platform (e.g., a website).

The chatbot generator platform may deploy the built chatbot to the chatbot host platform. In some implementations, the chatbot generator platform, by deploying the chatbot, may cause the chatbot host platform to host the chatbot through execution of code associated with the chatbot (e.g., code used to build the chatbot). For example, the chatbot generator platform, when deploying the chatbot, may provide instructions that cause the chatbot host platform or permit the chatbot host platform to launch the chatbot. In some implementations, the chatbot may be launched and/or deployed as a web page that can be embedded within a website. In such cases, one or more instructions may be provided in association with the chatbot to permit the web page to be embedded within the website.

In some implementations, the chatbot host platform is communicatively coupled with an application platform. Accordingly, when deploying the chatbot, the chatbot generator platform may cause the chatbot host platform to establish a communication link with the application platform to permit the chatbot host platform to be accessed via an application of the application platform (e.g., an application hosted by the application platform). In some implementations, the application may facilitate the interactions between the chatbot and users. For example, the users may access the chatbot via an interface of the application.

In some implementations, prior to deploying and/or launching the chatbot, the chatbot generator platform may provide the chatbot to an authorization platform for authentication. For example, the authorization platform may be configured to review, test, and/or analyze the chatbot to verify that the chatbot can be configured for use with a chatbot host platform and/or an application platform associated with the chatbot. In such cases, the authorization platform may be associated with the chatbot host platform and/or the application platform. Accordingly, the chatbot generator platform may provide the chatbot (or code that may be executed to implement the chatbot) to the authorization platform to permit the chatbot to be authenticated and/or verified for deployment in association with the application platform and/or launch by the chatbot host platform.

According to some implementations, prior to deploying and/or launching the chatbot, the chatbot generator platform may provide the chatbot to the chatbot developer to permit the chatbot developer to further develop and/or customize (or extend capabilities) of the chatbot. In such instances, the chatbot developer may be provided with instructions to permit the chatbot developer to customize the chatbot. In some implementations, such instructions may permit the chatbot developer to deploy and/or launch the chatbot via the chatbot host platform. Additionally, or alternatively, the chatbot generator platform may receive the customized chatbot from the chatbot developer, and deploy and/or launch the customized chatbot via the chatbot host platform.

In this way, the chatbot generator platform may deploy the generated chatbot and/or permit the chatbot to be launched by a chatbot host platform to permit operation of the chatbot.

As indicated above, FIGS. 1A and 1B are provided merely as one or more examples. Other examples may differ from what is described with regard to FIGS. 1A and 1B.

Accordingly, based on receiving a request to generate a chatbot, obtaining custom chatbot information for the chatbot, building the chatbot, and deploying the chatbot, the chatbot generator platform facilitates custom generation of a chatbot, as described herein. The chatbot generator platform may serve as a centralized system that utilizes one or more preconfigured templates, reusable corpuses, machine learning techniques, and/or the like to generate a corpus for the chatbot, configure a language analysis model for the chatbot, and cause the chatbot to be authenticated and launched. Accordingly, the chatbot generator platform may improve timing associated with generating the chatbot, reduce the amount of resources required to generate the chatbot (e.g., computing resources of several complex systems, network resources between such complex systems, and/or the like), and improve performance of the generated chatbots.

Figure 2:
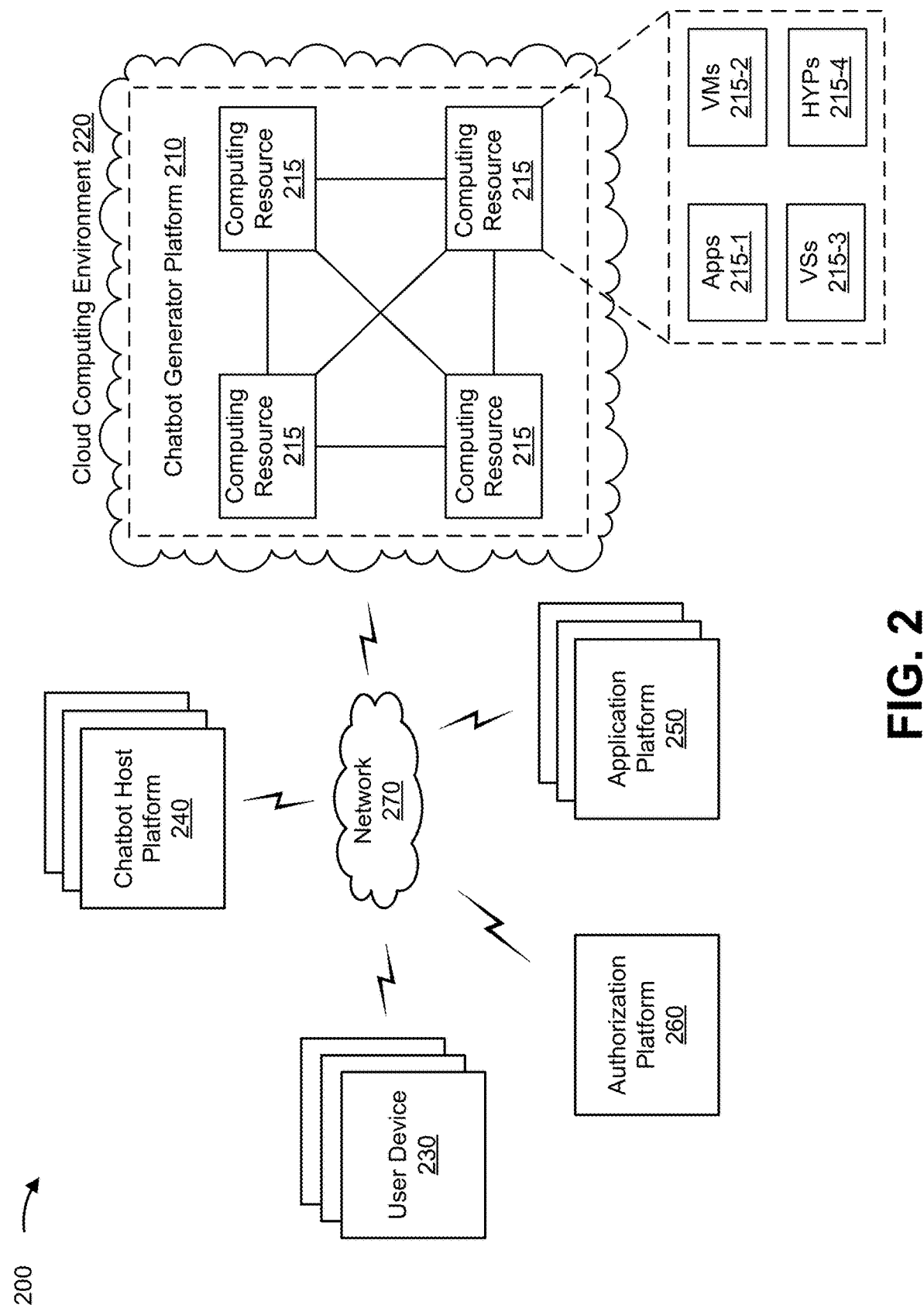
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a chatbot generator platform 210, a computing resource 215, a cloud computing environment 220, one or more user devices 230 (referred to herein individually as "user device 230" or collectively as "user devices 230"), one or more chatbot host platforms 240 (referred to herein individually as "chatbot host platform 240" or collectively as "chatbot host platforms 240"), one or more application platforms 250 (referred to herein individually as "application platform 250" or collectively as "application platforms 250"), an authorization platform 260, and a network 270. Devices of environment 200 may interconnect via wired connections, wireless connections, or a combination of wired and wireless connections.

Chatbot generator platform 210 includes one or more computing resources assigned to generate a chatbot as described herein. For example, chatbot generator platform 210 may be a platform implemented by cloud computing environment 220 that may receive a request to generate a chatbot, obtain custom chatbot information for the chatbot, build the chatbot according to the custom chatbot information, and deploy the chatbot to chatbot host platform 240 for launch.

Chatbot generator platform 210 may include a server device or a group of server devices. In some implementations, chatbot generator platform 210 may be hosted in cloud computing environment 220. Notably, while implementations described herein describe chatbot generator platform 210 as being hosted in cloud computing environment 220, in some implementations, chatbot generator platform 210 may be non-cloud-based or may be partially cloud-based.

Cloud computing environment 220 includes an environment that delivers computing as a service, whereby shared resources, services, etc. may be provided to user devices 230, chatbot host platforms 240, application platforms 250, and/or the like. Cloud computing environment 220 may provide computation, software, data access, storage, and/or other services that do not require end-user knowledge of a physical location and configuration of a system and/or a device that delivers the services. As shown, cloud computing environment 220 may include chatbot generator platform 210 and computing resource 215.

Computing resource 215 includes one or more personal computers, workstation computers, server devices, or another type of computation and/or communication device. In some implementations, computing resource 215 may host chatbot generator platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with chatbot generator platform 210 and/or any other software capable of being provided via cloud computing environment 220. In some implementations, one application 215-1 may send/receive information to/from one or more other applications 215-1, via virtual machine 215-2. According to some implementations, the one or more applications 215-1 may correspond to one or more services utilized by chatbots generated and/or launched by chatbot generator platform 210. For example, the one or more applications 215-1 may provide a language analysis service, a QnA service, a spell check service, an STT service, and/or the like. Additionally, or alternatively, the one or more applications 215-1 may implement one or more machine learning models described herein.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, the virtualized storage 215-3 may store one or more databases described herein (e.g., a template database, a training corpus database, a database of training data for one or more machine learning models, and/or the like).

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

User device 230 includes one or more devices capable of receiving, generating, storing, processing, and/or providing information associated with a chatbot (e.g., a chatbot generated using chatbot generator platform 210). Additionally, or alternatively, user device 230 may include one or more devices capable of receiving, generating, storing, processing, and/or providing information associated with an interaction involving a chatbot. For example, user device 230 may include a communication and/or computing device, such as a mobile phone (e.g., a smart phone, a radiotelephone, etc.), a laptop computer, a tablet computer, a handheld computer, a desktop computer, a wearable communication device (e.g., a smart wristwatch, a pair of smart eyeglasses, etc.), or a similar type of device.

Chatbot host platform 240 includes one or more devices capable of storing, processing, and/or routing information associated with launching and/or hosting a chatbot (e.g., a chatbot generated by chatbot generator platform 210). In some implementations, chatbot host platform 240 may include a communication interface that allows chatbot host platform 240 to receive information from and/or transmit information to other devices in environment 200.

Application platform 250 includes one or more devices capable of storing, processing, and/or routing information associated with hosting an application that is associated with a chatbot (e.g., a chatbot generated by chatbot generator platform 210). In some implementations, application platform 250 may include a communication interface that allows application platform 250 to receive information from and/or transmit information to other devices in environment 200.

Authorization platform 260 includes one or more devices capable of storing, processing, and/or routing information associated with authenticating and/or authorizing deployment or launch of a chatbot (e.g., a chatbot generated by chatbot generator platform 210). In some implementations, authorization platform 260 may include a communication interface that allows authorization platform 260 to receive information from and/or transmit information to other devices in environment 200.

Network 270 includes one or more wired and/or wireless networks. For example, network 270 may include a cellular network (e.g., a long-term evolution (LTE) network, a code division multiple access (CDMA) network, a 3G network, a 2G network, a 3G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
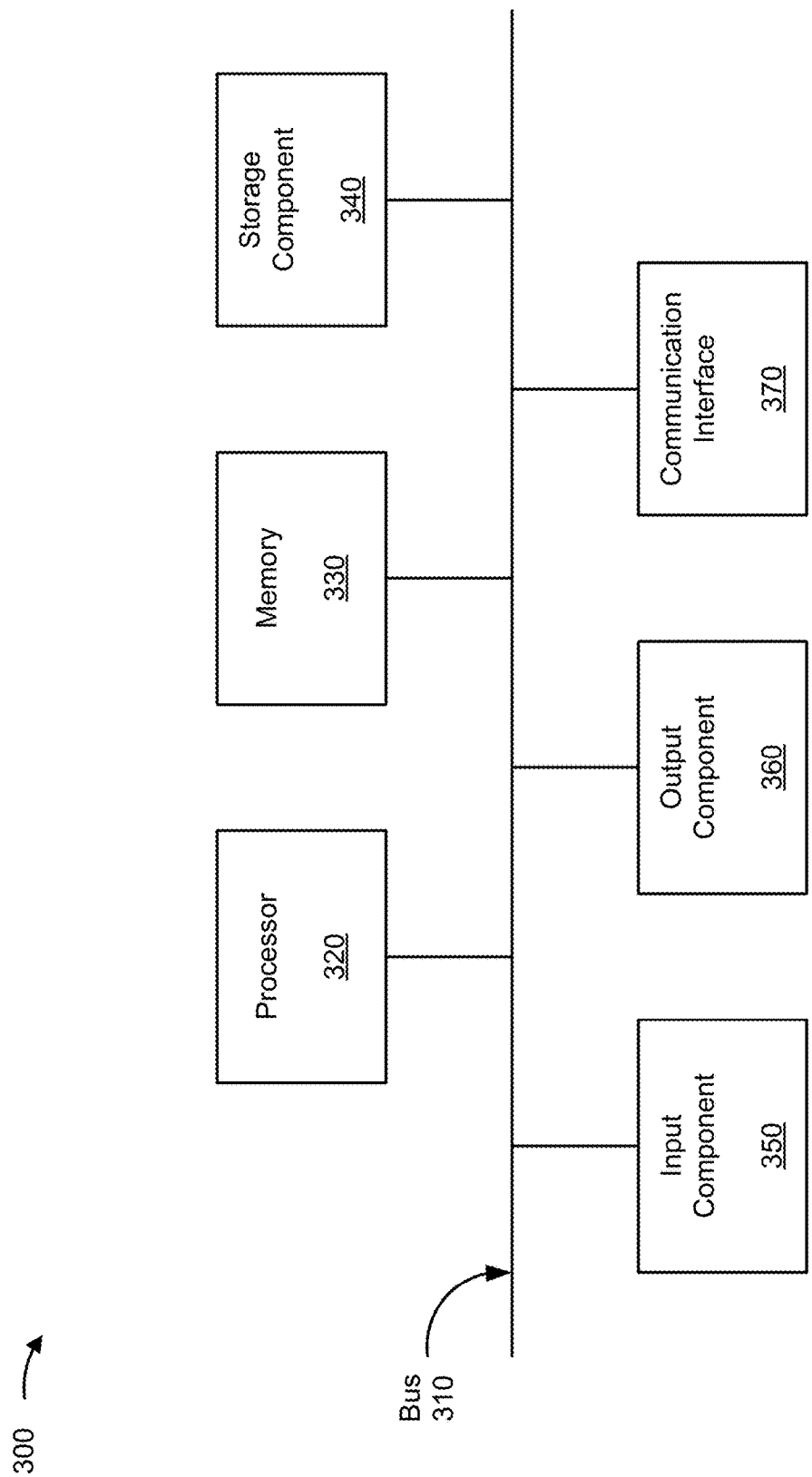
FIG. 3 is a diagram of example components of one or more devices of FIG. 2.

FIG. 3 is a diagram of example components of a device 300. Device 300 may correspond to chatbot generator platform 210, computing resource 215, user device 230, chatbot host platform 240, application platform 250, and/or authorization platform 260. In some implementations, chatbot generator platform 210, computing resource 215, user device 230, chatbot host platform 240, application platform 250, and/or authorization platform 260 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
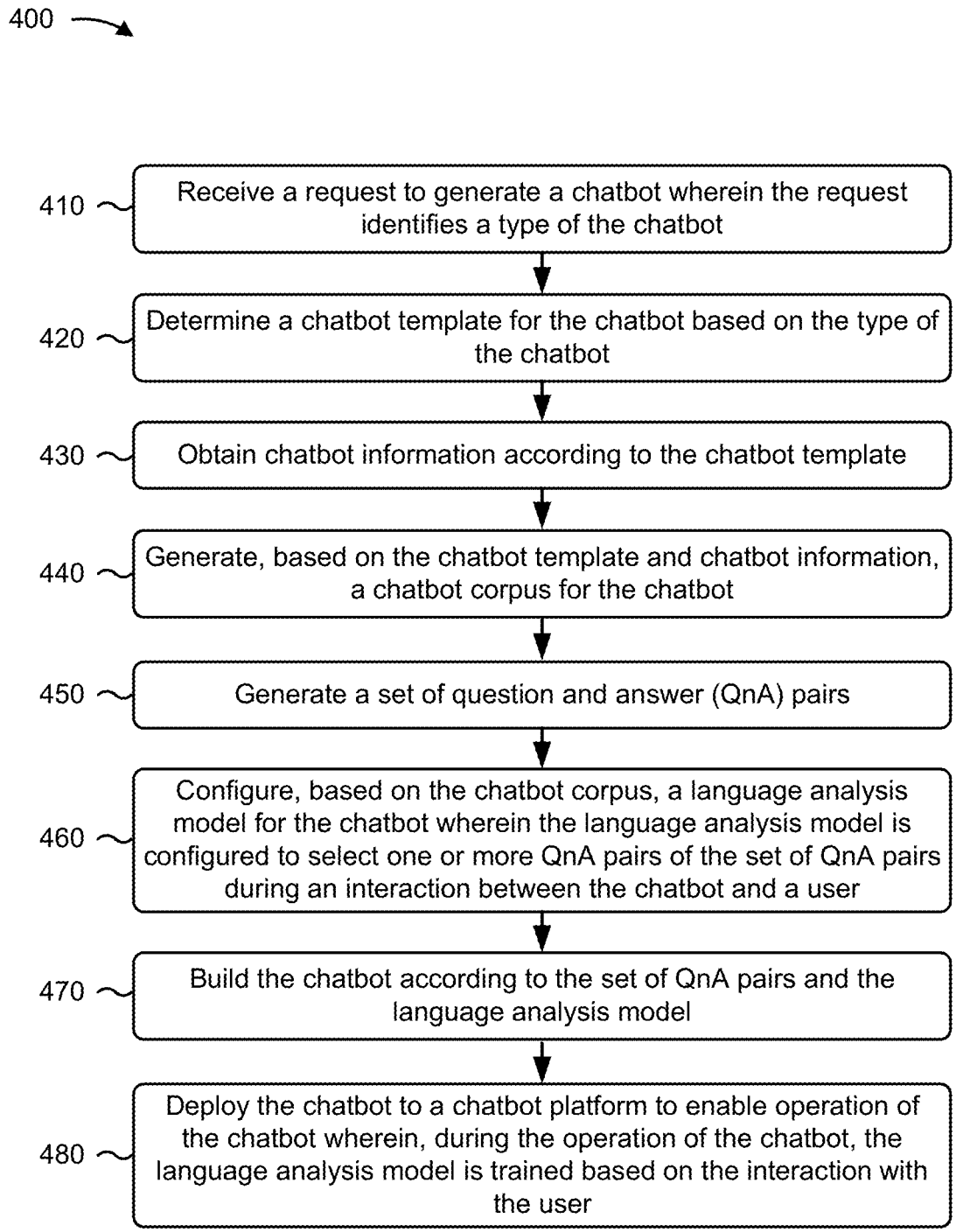
FIGS. 4-6 are flowcharts of one or more example processes associated with a chatbot generator platform.

FIG. 4 is a flowchart of an example process 400 associated with a chatbot generator platform described herein. In some implementations, one or more process blocks of FIG. 4 may be performed by a chatbot generator platform (e.g., chatbot generator platform 210). In some implementations, one or more process blocks of FIG. 4 may be performed by another device or a group of devices separate from or including the chatbot generator platform, such as a computing resource (e.g., computing resource 215), a user device (e.g., user device 230), a chatbot host platform (e.g., chatbot host platform 240), an application platform (e.g., application platform 250) and an authorization platform (e.g., authorization platform 260), and/or the like.

As shown in FIG. 4, process 400 may include receiving a request to generate a chatbot wherein the request identifies a type of the chatbot (block 410). For example, the chatbot generator platform (e.g., using processor 320, memory 330, storage component 340, input component 350, output component 360, communication interface 370 and/or the like) may receive a request to generate a chatbot, as described above. In some implementations, the request identifies a type of the chatbot.

As further shown in FIG. 4, process 400 may include determining a chatbot template for the chatbot based on the type of the chatbot (block 420). For example, the chatbot generator platform (e.g., using processor 320, memory 330, storage component 340, input component 350, output component 360, communication interface 370 and/or the like) may determine a chatbot template for the chatbot based on the type of the chatbot, as described above.

As further shown in FIG. 4, process 400 may include obtaining chatbot information according to the chatbot template (block 430). For example, the chatbot generator platform (e.g., using processor 320, memory 330, storage component 340, input component 350, output component 360, communication interface 370 and/or the like) may obtain chatbot information according to the chatbot template, as described above.

As further shown in FIG. 4, process 400 may include generating, based on the chatbot template and chatbot information, a chatbot corpus for the chatbot (block 440). For example, the chatbot generator platform (e.g., using processor 320, memory 330, storage component 340, input component 350, output component 360, communication interface 370 and/or the like) may generate, based on the chatbot template and chatbot information, a chatbot corpus for the chatbot, as described above.

As further shown in FIG. 4, process 400 may include generating a set of question and answer (QnA) pairs (block 450). For example, the chatbot generator platform (e.g., using processor 320, memory 330, storage component 340, input component 350, output component 360, communication interface 370 and/or the like) may generate a set of QnA pairs, as described above.

As further shown in FIG. 4, process 400 may include configuring, based on the chatbot corpus, a language analysis model for the chatbot wherein the language analysis model is configured to select one or more QnA pairs of the set of QnA pairs during an interaction between the chatbot and a user (block 460). For example, the chatbot generator platform (e.g., using processor 320, memory 330, storage component 340, input component 350, output component 360, communication interface 370 and/or the like) may configure, based on the chatbot corpus, a language analysis model for the chatbot, as described above. In some implementations, the language analysis model is configured to select one or more QnA pairs of the set of QnA pairs during an interaction between the chatbot and a user.

As further shown in FIG. 4, process 400 may include building the chatbot according to the set of QnA pairs and the language analysis model (block 470). For example, the chatbot generator platform (e.g., using processor 320, memory 330, storage component 340, input component 350, output component 360, communication interface 370 and/or the like) may build the chatbot according to the set of QnA pairs and the language analysis model, as described above.

As further shown in FIG. 4, process 400 may include deploying the chatbot to a chatbot host platform to enable operation of the chatbot wherein, during the operation of the chatbot, the language analysis model is trained based on the interaction with the user (block 480). For example, the chatbot generator platform (e.g., using processor 320, memory 330, storage component 340, input component 350, output component 360, communication interface 370 and/or the like) may deploy the chatbot to a chatbot host platform to enable operation of the chatbot, as described above. In some implementations, during the operation of the chatbot, the language analysis model is trained based on the interaction with the user.

Process 400 may include additional implementations, such as any single implementation or any combination of implementations described below and/or in connection with one or more other processes described elsewhere herein.

In some implementations, the set of QnA pairs are generated based on the chatbot information. In some implementations, the chatbot information identifies at least one of a format of the chatbot, a topic associated with the chatbot, or a context associated with the chatbot. In some implementations, the set of QnA pairs are generated based on the chatbot information and a training chatbot corpus.

In some implementations, the request is received from a user device. In some implementations, the chatbot information is obtained according to the chatbot template by providing the chatbot template to the user device and receiving the chatbot information according to one or more prompts. In some implementations, the chatbot template includes the one or more prompts for the chatbot information.

In some implementations, the language analysis model is configured to select the set of QnA pairs during the interaction based on the chatbot corpus. In some implementations, the chatbot corpus includes a set of simulated user inputs and a set of simulated chatbot responses. In some implementations, the language analysis model comprises a machine learning model that is trained according to the interaction during the operation of the chatbot and at least one of one or more other interactions associated with the chatbot, or one or more other interactions associated with one or more other chatbots.

In some implementations, the type of the chatbot includes at least one of a frequently asked questions (FAQ) chatbot, a survey chatbot, a user support chatbot, a project management chatbot, an information technologies support chatbot, or a sales assistant chatbot.

In some implementations, the chatbot host platform is communicatively coupled with an application platform. In some implementations, the chatbot is built to be accessed via an application of the application platform. In some implementations, the interaction involves a communication facilitated by the application hosted by the application platform.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
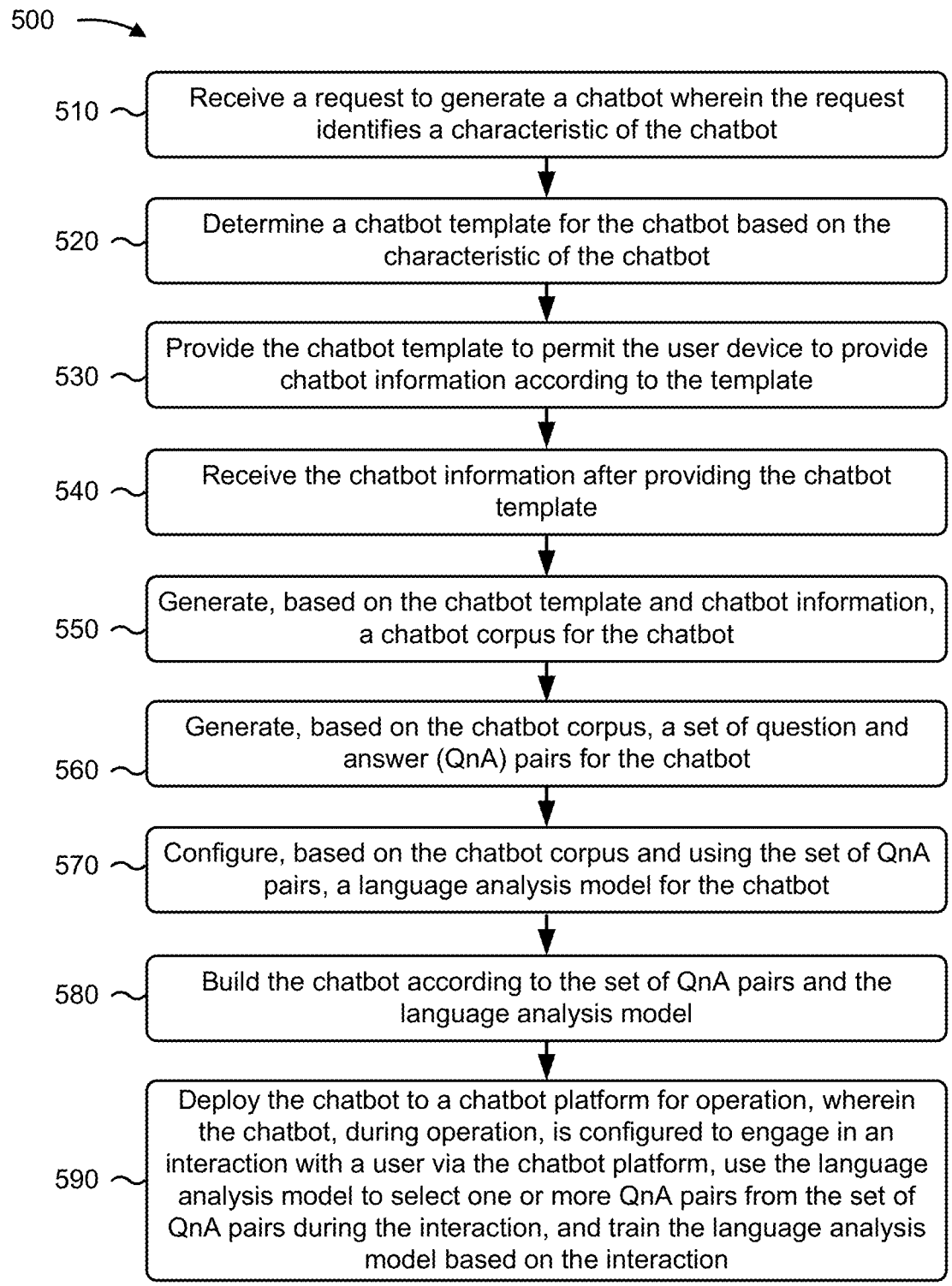

FIG. 5 is a flowchart of an example process 500 associated with a chatbot generator platform described herein. In some implementations, one or more process blocks of FIG. 5 may be performed by a chatbot generator platform (e.g., chatbot generator platform 210). In some implementations, one or more process blocks of FIG. 5 may be performed by another device or a group of devices separate from or including the chatbot generator platform, such as a computing resource (e.g., computing resource 215), a chatbot host platform (e.g., chatbot host platform 240), an application platform (e.g., application platform 250) and an authorization platform (e.g., authorization platform 260), and/or the like.

As shown in FIG. 5, process 500 may include receiving, from a user device, a request to generate a chatbot wherein the request identifies a characteristic of the chatbot (block 510). For example, the chatbot generator platform (e.g., using processor 320, memory 330, storage component 340, input component 350, output component 360, communication interface 370 and/or the like) may receive, from a user device, a request to generate a chatbot, as described above. In some implementations, the request identifies a characteristic of the chatbot.

As further shown in FIG. 5, process 500 may include determining a chatbot template for the chatbot based on the characteristic of the chatbot (block 520). For example, the chatbot generator platform (e.g., using processor 320, memory 330, storage component 340, input component 350, output component 360, communication interface 370 and/or the like) may determine a chatbot template for the chatbot based on the characteristic of the chatbot, as described above.

As further shown in FIG. 5, process 500 may include providing, to the user device, the chatbot template to permit the user device to provide chatbot information according to the template (block 530). For example, the chatbot generator platform (e.g., using processor 320, memory 330, storage component 340, input component 350, output component 360, communication interface 370 and/or the like) may provide, to the user device, the chatbot template to permit the user device to provide chatbot information according to the template, as described above.

As further shown in FIG. 5, process 500 may include receiving the chatbot information after providing the chatbot template (block 540). For example, the chatbot generator platform (e.g., using processor 320, memory 330, storage component 340, input component 350, output component 360, communication interface 370 and/or the like) may receive the chatbot information after providing the chatbot template, as described above.

As further shown in FIG. 5, process 500 may include generating, based on the chatbot template and chatbot information, a chatbot corpus for the chatbot (block 550). For example, the chatbot generator platform (e.g., using processor 320, memory 330, storage component 340, input component 350, output component 360, communication interface 370 and/or the like) may generate, based on the chatbot template and chatbot information, a chatbot corpus for the chatbot, as described above.

As further shown in FIG. 5, process 500 may include generating, based on the chatbot corpus, a set of question and answer (QnA) pairs for the chatbot (block 560). For example, the chatbot generator platform (e.g., using processor 320, memory 330, storage component 340, input component 350, output component 360, communication interface 370 and/or the like) may generate, based on the chatbot corpus, a set of question and answer (QnA) pairs for the chatbot, as described above.

As further shown in FIG. 5, process 500 may include configuring, based on the chatbot corpus and using the set of QnA pairs, a language analysis model for the chatbot (block 570). For example, the chatbot generator platform (e.g., using processor 320, memory 330, storage component 340, input component 350, output component 360, communication interface 370 and/or the like) may configure, based on the chatbot corpus and using the set of QnA pairs, a language analysis model for the chatbot, as described above.

As further shown in FIG. 5, process 500 may include building the chatbot according to the set of QnA pairs and the language analysis model (block 580). For example, the chatbot generator platform (e.g., using processor 320, memory 330, storage component 340, input component 350, output component 360, communication interface 370 and/or the like) may build the chatbot according to the set of QnA pairs and the language analysis model, as described above.

As further shown in FIG. 5, process 500 may include deploying the chatbot to a chatbot host platform for operation, wherein the chatbot, during operation, is configured to engage in an interaction with a user via the chatbot host platform, use the language analysis model to select one or more QnA pairs from the set of QnA pairs during the interaction, and train the language analysis model based on the interaction (block 590). For example, the chatbot generator platform (e.g., using processor 320, memory 330, storage component 340, input component 350, output component 360, communication interface 370 and/or the like) may deploy the chatbot to a chatbot host platform for operation, as described above. In some implementations, the chatbot, during operation, is configured to engage in an interaction with a user via the chatbot host platform, use the language analysis model to select one or more QnA pairs from the set of QnA pairs during the interaction, and train the language analysis model based on the interaction.

Process 500 may include additional implementations, such as any single implementation or any combination of implementations described below and/or in connection with one or more other processes described elsewhere herein.

In some implementations, the chatbot generator platform, when generating the chatbot corpus, may generate, using a machine learning model, the chatbot corpus to include a set of simulated user inputs and a set of simulated responses. In some implementations, the machine learning model is trained based on a plurality of chatbot corpuses stored in a data structure that is communicatively coupled with the chatbot generator platform. In some implementations, the machine learning model is configured to generate the set of simulated user inputs and the set of simulated responses according to sets of simulated user inputs and sets of simulated responses in the plurality of chatbot corpuses.

In some implementations, the chatbot comprises a first chatbot, the request is received by a second chatbot associated with the device, the chatbot template is provided by the second chatbot, and the custom chatbot information is received by the second chatbot. In some implementations, the language analysis model comprises a machine learning model. In some implementations, the machine learning model is trained based on one or more other interactions associated with the chatbot or one or more other interactions associated with one or more other chatbots.

In some implementations, the characteristic of the chatbot includes at least one of a type of the chatbot, a format of the chatbot, or a source of the chatbot. In some implementations, the chatbot host platform is communicatively coupled with an application platform. In some implementations, the interaction involves a communication facilitated by an application hosted by the application platform.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
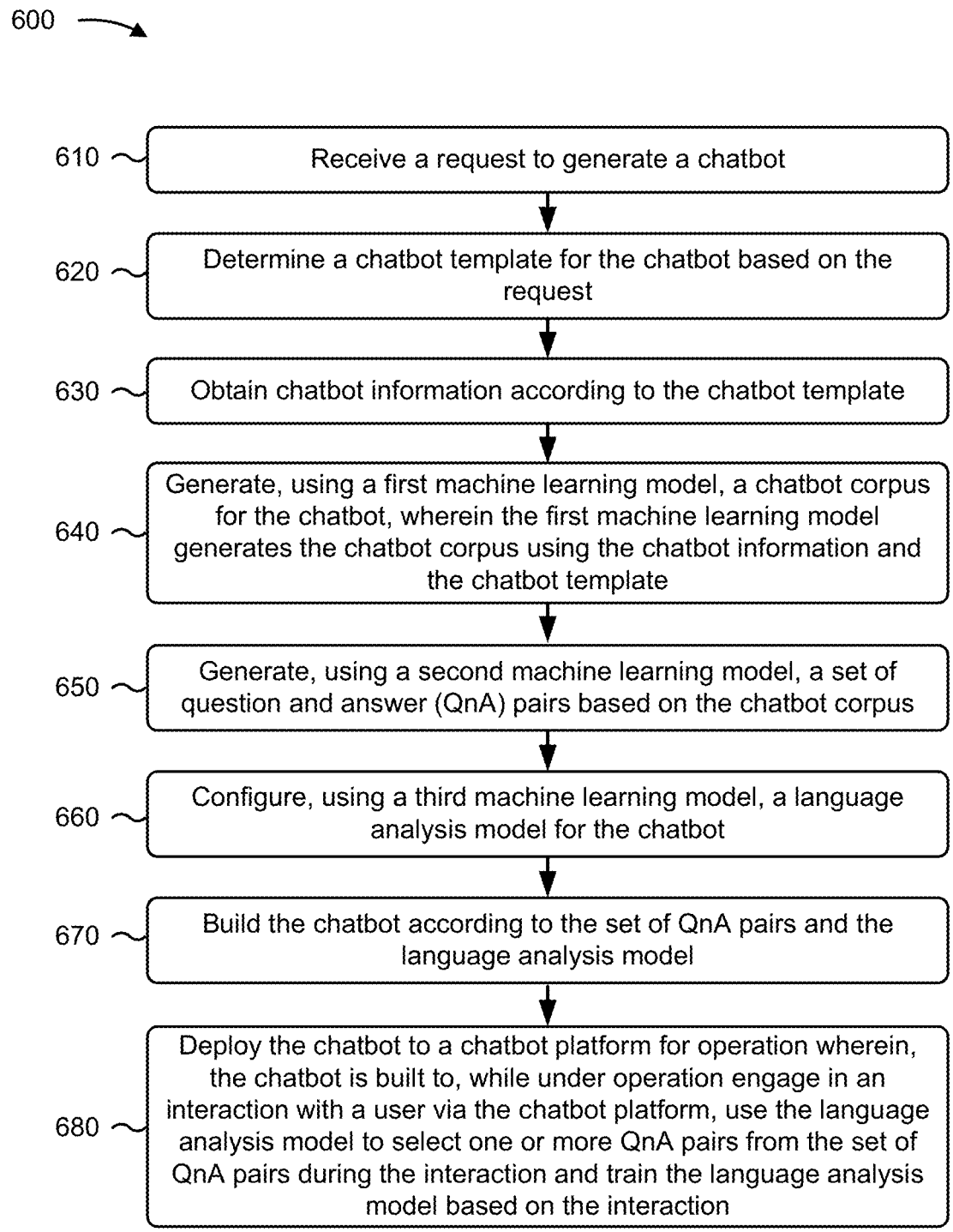

FIG. 6 is a flowchart of an example process 600 associated with a chatbot generator platform described herein. In some implementations, one or more process blocks of FIG. 6 may be performed by a chatbot generator platform (e.g., chatbot generator platform 210). In some implementations, one or more process blocks of FIG. 6 may be performed by another device or a group of devices separate from or including the chatbot generator platform, such as a computing resource (e.g., computing resource 215), a chatbot host platform (e.g., chatbot host platform 240), an application platform (e.g., application platform 250) and an authorization platform (e.g., authorization platform 260), and/or the like.

As shown in FIG. 6, process 600 may include receiving a request to generate a chatbot (block 610). For example, the chatbot generator platform (e.g., using processor 320, memory 330, storage component 340, input component 350, output component 360, communication interface 370 and/or the like) may receive a request to generate a chatbot, as described above.

As further shown in FIG. 6, process 600 may include determining a chatbot template for the chatbot based on the request (block 620). For example, the chatbot generator platform (e.g., using processor 320, memory 330, storage component 340, input component 350, output component 360, communication interface 370 and/or the like) may determine a chatbot template for the chatbot based on the request, as described above.

As further shown in FIG. 6, process 600 may include obtaining chatbot information according to the chatbot template (block 630). For example, the chatbot generator platform (e.g., using processor 320, memory 330, storage component 340, input component 350, output component 360, communication interface 370 and/or the like) may obtain chatbot information according to the chatbot template, as described above.

As further shown in FIG. 6, process 600 may include generating, using a first machine learning model, a chatbot corpus for the chatbot, wherein the first machine learning model generates the chatbot corpus using the chatbot information and the chatbot template (block 640). For example, the chatbot generator platform (e.g., using processor 320, memory 330, storage component 340, input component 350, output component 360, communication interface 370 and/or the like) may generate, using a first machine learning model, a chatbot corpus for the chatbot, as described above. In some implementations, the first machine learning model generates the chatbot corpus using the chatbot information and the chatbot template.

As further shown in FIG. 6, process 600 may include generating, using a second machine learning model, a set of question and answer (QnA) pairs based on the chatbot corpus (block 650). For example, the chatbot generator platform (e.g., using processor 320, memory 330, storage component 340, input component 350, output component 360, communication interface 370 and/or the like) may generate, using a second machine learning model, a set of question and answer (QnA) pairs based on the chatbot corpus, as described above.

As further shown in FIG. 6, process 600 may include configuring, using a third machine learning model, a language analysis model for the chatbot (block 660). For example, the chatbot generator platform (e.g., using processor 320, memory 330, storage component 340, input component 350, output component 360, communication interface 370 and/or the like) may configure, using a third machine learning model, a language analysis model for the chatbot, as described above.

As further shown in FIG. 6, process 600 may include building the chatbot according to the set of QnA pairs and the language analysis model (block 670). For example, the chatbot generator platform (e.g., using processor 320, memory 330, storage component 340, input component 350, output component 360, communication interface 370 and/or the like) may build the chatbot according to the set of QnA pairs and the language analysis model, as described above.

As further shown in FIG. 6, process 600 may include deploying the chatbot to a chatbot host platform for operation, wherein the chatbot is built to, while under operation, engage in an interaction with a user via the chatbot host platform, use the language analysis model to select one or more QnA pairs from the set of QnA pairs during the interaction, and train the language analysis model based on the interaction (block 680). For example, the chatbot generator platform (e.g., using processor 320, memory 330, storage component 340, input component 350, output component 360, communication interface 370 and/or the like) may deploy the chatbot to a chatbot host platform for operation, as described above. In some implementations, the chatbot is built to, while under operation, engage in an interaction with a user via the chatbot host platform, use the language analysis model to select one or more QnA pairs from the set of QnA pairs during the interaction, and train the language analysis model based on the interaction.

Process 600 may include additional implementations, such as any single implementation or any combination of implementations described below and/or in connection with one or more other processes described elsewhere herein.

In some implementations, the first machine learning model is trained based on a set of simulated user inputs and a set of simulated chatbot responses associated with one or more other chatbot corpuses.

In some implementations, the second machine learning model is trained based on sets of QnA pairs associated with one or more other chatbots. In some implementations, the third machine learning model is trained based on at least one of learning analysis models associated with one or more other chatbots. In some implementations, the one or more other chatbots are associated with the chatbot based on being at least one of a same type of chatbot, a same format of chatbot, a same source of chatbot, being associated with a same topic, or being associated with a same context.

In some implementations, two or more of the first machine learning model, the second machine learning model, and the third machine learning model are associated with a same chatbot generation model. In some implementations, the chatbot host platform is communicatively coupled with an application platform. In some implementations, the chatbot is built to be accessible via an application hosted by the application platform.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, a chatbot, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a request to generate a chatbot, wherein the request identifies a type of the chatbot;
   determining, by the device, a chatbot template for the chatbot based on the type of the chatbot;
   obtaining, by the device, chatbot information according to the chatbot template;
   generating, by the device and based on the chatbot template and the chatbot information, a chatbot corpus for the chatbot;
   generating, by the device, a set of question and answer (QnA) pairs;
   configuring, by the device and based on the chatbot corpus, a language analysis model for the chatbot, wherein the language analysis model is configured to select one or more QnA pairs of the set of QnA pairs during an interaction between the chatbot and a user;
building, by the device, the chatbot according to the set of QnA pairs and the language analysis model; and
deploying, by the device, the chatbot to a chatbot host platform to enable operation of the chatbot,
wherein, during the operation of the chatbot, the language analysis model is trained based on the interaction with the user.

2. The method of claim 1, wherein the set of QnA pairs are generated based on the chatbot information,
wherein the chatbot information identifies at least one of:
a format of the chatbot,
a topic associated with the chatbot, or
a context associated with the chatbot.

3. The method of claim 1, wherein the set of QnA pairs are generated based on the chatbot information and a training chatbot corpus.

4. The method of claim 1, wherein the request is received from a user device, and wherein the chatbot information is obtained according to the chatbot template by:
providing the chatbot template to the user device,
wherein the chatbot template includes prompts for the chatbot information, and
receiving the chatbot information according to the prompts.

5. The method of claim 1, wherein the language analysis model is configured to select the set of QnA pairs during the interaction based on the chatbot corpus,
wherein the chatbot corpus includes a set of simulated user inputs and a set of simulated chatbot responses.

6. The method of claim 1, wherein the language analysis model comprises a machine learning model that is trained according to the interaction during the operation of the chatbot and at least one of:
one or more other interactions associated with the chatbot, or
one or more other interactions associated with one or more other chatbots.

7. The method of claim 1, wherein the type of the chatbot includes at least one of:
a frequently asked questions (FAQ) chatbot,
a survey chatbot,
a user support chatbot,
a project management chatbot,
an information technologies support chatbot, or
a sales assistant chatbot.

8. The method of claim 1, wherein the chatbot host platform is communicatively coupled with an application platform,
wherein the chatbot is built to be accessed via an application of the application platform, and
wherein the interaction involves a communication facilitated by the application hosted by the application platform.

9. A device, comprising:
one or more memories; and
one or more processors communicatively coupled to the one or more memories, configured to:
receive, from a user device, a request to generate a chatbot,
wherein the request identifies a characteristic of the chatbot;
determine a chatbot template for the chatbot based on the characteristic of the chatbot;
provide, to the user device, the chatbot template to permit the user device to provide custom chatbot information according to the chatbot template;
receive the custom chatbot information after providing the chatbot template;
generate, based on the chatbot template and the custom chatbot information, a chatbot corpus for the chatbot;
generate, based on the chatbot corpus, a set of question and answer (QnA) pairs for the chatbot;
configure, based on the chatbot corpus and using the set of QnA pairs, a language analysis model for the chatbot;
build the chatbot according to the set of QnA pairs and the language analysis model; and
deploy the chatbot to a chatbot host platform for operation,
wherein, the chatbot, during operation, is configured to:
engage in an interaction with a user via the chatbot host platform,
use the language analysis model to select one or more QnA pairs from the set of QnA pairs during the interaction, and
train the language analysis model based on the interaction.

10. The device of claim 9, wherein the one or more processors, when generating the chatbot corpus, are to:
generate, using a machine learning model, the chatbot corpus to include a set of simulated user inputs and a set of simulated responses,
wherein the machine learning model is trained based on a plurality of chatbot corpuses stored in a data structure that is communicatively coupled with the one or more processors,
wherein the machine learning model is configured to generate the set of simulated user inputs and the set of simulated responses according to sets of simulated user inputs and sets of simulated responses in the plurality of chatbot corpuses.

11. The device of claim 9, wherein the chatbot comprises a first chatbot, and
wherein the request is received by a second chatbot associated with the device,
wherein the chatbot template is provided by the second chatbot, and
wherein the custom chatbot information is received by the second chatbot.

12. The device of claim 9, wherein the language analysis model comprises a machine learning model,
wherein the machine learning model is trained based on:
one or more other interactions associated with the chatbot, or
one or more other interactions associated with one or more other chatbots.

13. The device of claim 9, wherein the characteristic of the chatbot includes at least one of:
a type of the chatbot,
a format of the chatbot, or
a source of the chatbot.

14. The device of claim 9, wherein the chatbot host platform is communicatively coupled with an application platform,
wherein the interaction involves a communication facilitated by an application hosted by the application platform.

15. A non-transitory computer-readable medium storing instructions, the instructions comprising:

one or more instructions that, when executed by one or more processors, cause the one or more processors to:
receive a request to generate a chatbot;
determine a chatbot template for the chatbot based on the request;
obtain custom chatbot information according to the chatbot template;
generate, using a first machine learning model, a chatbot corpus for the chatbot,
    wherein the first machine learning model generates the chatbot corpus using the custom chatbot information and the chatbot template;
generate, using a second machine learning model, a set of question and answer (QnA) pairs based on the chatbot corpus;
configure, using a third machine learning model, a language analysis model for the chatbot;
build the chatbot according to the set of QnA pairs and the language analysis model; and
deploy the chatbot to a chatbot host platform for operation,
    wherein, the chatbot is built to, while under operation:
        engage in an interaction with a user via the chatbot host platform,
        use the language analysis model to select one or more QnA pairs from the set of QnA pairs during the interaction, and
        train the language analysis model based on the interaction.

16. The non-transitory computer-readable medium of claim 15, wherein the first machine learning model is trained based on a set of simulated user inputs and a set of simulated chatbot responses associated with one or more other chatbot corpuses.

17. The non-transitory computer-readable medium of claim 15, wherein the second machine learning model is trained based on sets of QnA pairs associated with one or more other chatbots,
    wherein the one or more other chatbots are associated with the chatbot based on being at least one of:
        a same type of chatbot,
        a same format of chatbot,
        a same source of chatbot,
        being associated with a same topic, or
        being associated with a same context.

18. The non-transitory computer-readable medium of claim 15, wherein the third machine learning model is trained based on at least one of learning analysis models associated with one or more other chatbots,
    wherein the one or more other chatbots are associated with the chatbot based on being at least one of:
        a same type of chatbot,
        a same format of chatbot,
        a same source of chatbot,
        being associated with a same topic, or
        being associated with a same context.

19. The non-transitory computer-readable medium of claim 15, wherein the first machine learning model, the second machine learning model, and the third machine learning model are associated with a same chatbot generation model.

20. The non-transitory computer-readable medium of claim 15, wherein the chatbot host platform is communicatively coupled with an application platform,
    wherein the chatbot is built to be accessible via an application hosted by the application platform.

\* \* \* \* \*